(12) United States Patent
Waltman et al.

(10) Patent No.: US 11,325,745 B1
(45) Date of Patent: May 10, 2022

(54) SKID APPARATUS, SYSTEM AND METHOD

(71) Applicant: Innovative Steel Works & Fabrication, LLC, Rockvale, TN (US)

(72) Inventors: Greg Waltman, Rockvale, TN (US); William B. McDowell, Murfreesboro, TN (US)

(*) Notice: Subject to any disclaimer, the term of this patent is extended or adjusted under 35 U.S.C. 154(b) by 31 days.

(21) Appl. No.: 16/653,214

(22) Filed: Oct. 15, 2019

Related U.S. Application Data

(63) Continuation-in-part of application No. 16/582,417, filed on Sep. 25, 2019.

(60) Provisional application No. 62/745,841, filed on Oct. 15, 2018, provisional application No. 62/736,841, (Continued)

(51) Int. Cl.
| | |
|---|---|
| B65D 19/00 | (2006.01) |
| B65D 19/40 | (2006.01) |
| F16M 11/24 | (2006.01) |
| F16L 3/20 | (2006.01) |
| E03F 5/04 | (2006.01) |
| E04H 9/14 | (2006.01) |
| F16L 3/23 | (2006.01) |
| F16M 11/20 | (2006.01) |

(52) U.S. Cl.
CPC ..... *B65D 19/0002* (2013.01); *B65D 19/0059* (2013.01); *B65D 19/0091* (2013.01); *B65D 19/40* (2013.01); *E04H 9/14* (2013.01); *F16L 3/23* (2013.01); *F16M 11/2085* (2013.01); *F16M 11/24* (2013.01); *F16M 2200/08* (2013.01)

(58) Field of Classification Search
CPC ....... F16L 3/20; F16M 11/24; F16M 2200/08; F16M 3/223; E04H 9/14; E04F 15/0247; E04F 15/02452; B65D 19/0002; B65D 19/0059; B65D 19/0091; B65D 19/40
See application file for complete search history.

(56) References Cited

U.S. PATENT DOCUMENTS

| | | | | |
|---|---|---|---|---|
| 5,609,111 A | * | 3/1997 | Hasegawa | B65D 7/24 108/55.1 |
| 5,911,812 A | * | 6/1999 | Stanek | A47J 37/0786 99/446 |

(Continued)

FOREIGN PATENT DOCUMENTS

CN 203549135 U 4/2014

OTHER PUBLICATIONS

Anchorage: Pipe Support Systems & Components. Anchorage-Group-Catalogue. Jun. 2020. Last accessed Oct. 28, 2021 from https://anchoragegroup.com.au/wp-content/uploads/2020/07/Anchorage-Revit-Content-User-Guide-by-IGS.pdf., 47 pages.

(Continued)

*Primary Examiner* — Tan Le
(74) *Attorney, Agent, or Firm* — Patterson Intellectual Property Law, P.C.; Ryan D. Levy

(57) ABSTRACT

Apparatuses, systems, and methods are provided for a skid system including a skid apparatus. The skid apparatus may include a skid frame including at least one lateral member coupled to at least one side member at a coupling location, a skid plate coupleable to at least one of the at least one lateral member or to the at least one side member, at least one skid slot extending through the skid plate, and a pipe support configured to couple to the at least one skid slot.

7 Claims, 7 Drawing Sheets

Related U.S. Application Data filed on Sep. 26, 2018, provisional application No. 62/735,887, filed on Sep. 25, 2018.

(56) References Cited

U.S. PATENT DOCUMENTS

| | | | | |
|---|---|---|---|---|
| 6,562,233 | B1* | 5/2003 | Schilling | B01D 29/96 210/164 |
| 8,196,229 | B1* | 6/2012 | Hickok | E03F 5/041 4/288 |
| 9,714,726 | B1 | 7/2017 | Laidley et al. | |
| 2005/0232701 | A1* | 10/2005 | Humphries | E03F 5/06 405/43 |
| 2014/0262584 | A1* | 9/2014 | Lovold | B60K 13/04 180/246 |
| 2016/0169442 | A1 | 6/2016 | Storjohann | |
| 2017/0102097 | A1 | 4/2017 | Walston et al. | |
| 2019/0226193 | A1* | 7/2019 | Deurloo | E03F 5/046 |

OTHER PUBLICATIONS

E-Z Line Pipe Support Co., LLC: E-Z Line Adjustable Pipe Support Brochure, Last accessed Oct. 28, 2021 from https://www.ezline.com/ezline-adjustable-pipe-supports/, 1 page.

Heartland Pipe Support Systems: Heartland Pipe Support Systems Configurations Brochure, Last accessed Oct. 28, 2021 from http://www.jamesonsteel.com, 2 pages.

Piping Technology & Products, Inc.: Adjustable Pipe Saddle Support, Last accessed Oct. 28, 2021 from https://pipingtech.com/wp-content/uploads/2017/07/fig46-pipesaddle.pdf, 1 page.

Piping Technology & Products, Inc.: Pipe Saddle Support with U-Bolt, Last accessed Oct. 28, 2021 from https://pipingtech.com/wp-content/uploads/2017/07/fig48-pipesaddle.pdf, 1 page.

Vibro-Acoustics: SPS Seismic Pipe Stand (Fixed Height) and SPSA (Adjustable Height) Installation Instructions File No. INS-SPS-002, Last accessed Oct. 28, 2021 from https://virs.vibro-acoustics.com/wp-content/uploads/sites/9/INS-SPS.pdf, Jun. 8, 2012, 1 page.

* cited by examiner

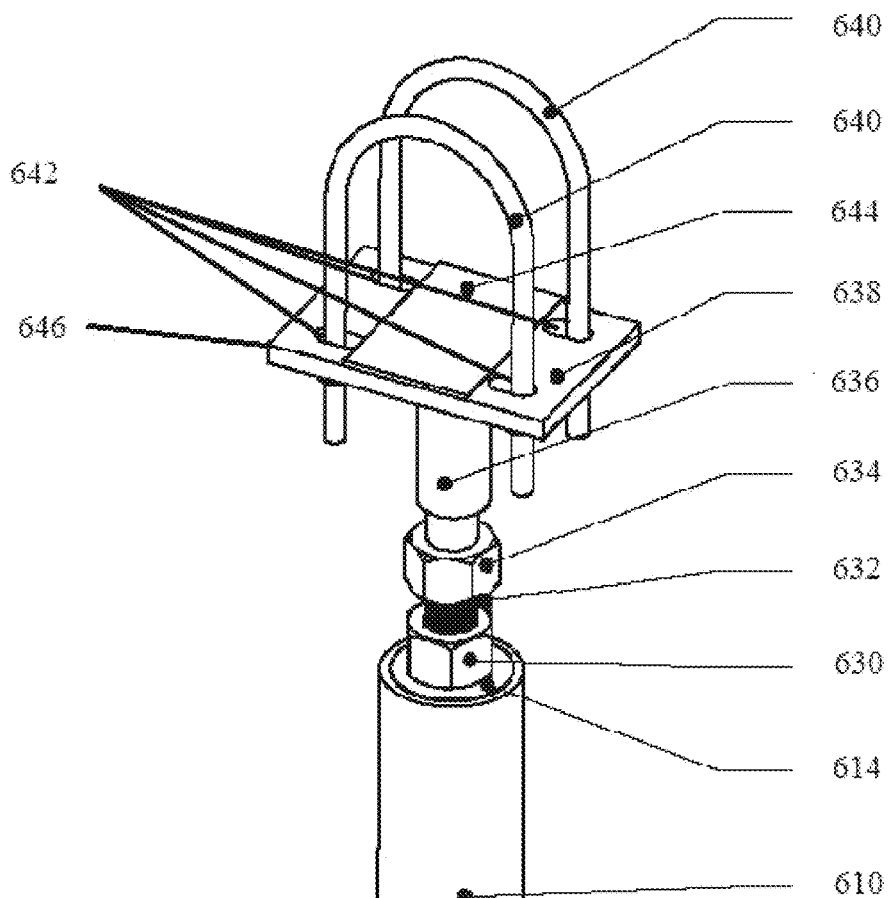
FIG. 6
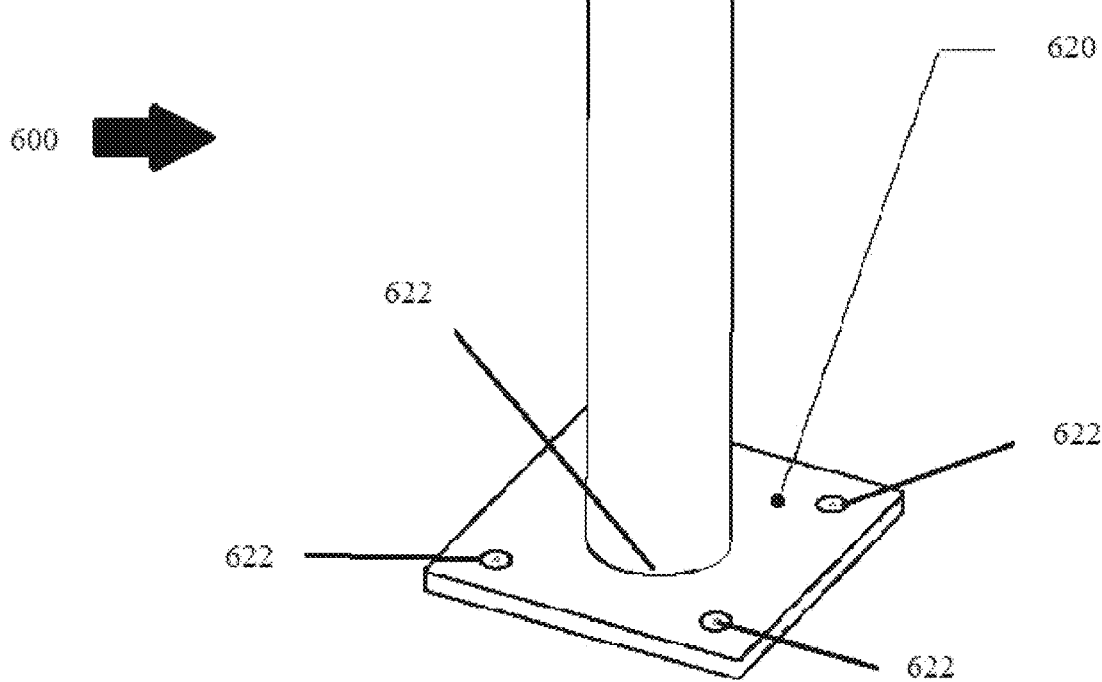

SKID APPARATUS, SYSTEM AND METHOD

CROSS-REFERENCES TO RELATED APPLICATIONS

This application is a continuation-in-part of U.S. patent application Ser. No. 16/582,417, dated Sep. 25, 2019, entitled "Adjustable Support Apparatus and Method of Use," which claims benefit of each of U.S. Provisional Patent Application No. 62/735,887, dated Sep. 25, 2018, entitled "Support Apparatus," and the benefit of U.S. Provisional Patent Application No. 62/736,841, dated Sep. 26, 2018, entitled "Support Apparatus," and benefit of U.S. Provisional Patent Application No. 62/745,841, entitled "Skid Apparatus, System, and Method," dated Oct. 15, 2018, each of which is hereby incorporated by reference in its entirety.

A portion of the disclosure of this patent document contains material that is subject to copyright. The copyright owner has no objection to the authorized facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

It is common in the utility industry and various industrial applications to mount equipment on structural skids for easy shipment as well as unitized installation. By locating piping, valves, and various equipment on skids the amount of field fabrication is reduced. This process works well unless adjustments are required during installation. Supports and various structural steel are typically welded to I-beams that make up the frame of the traditional skid. Any adjustments that are needed require structural supports to be cut free of the I-beam frame and welded back into place after repositioning.

BRIEF SUMMARY OF THE INVENTION

Disclosed herein is a skid and skid system coupleable to supports, pipe stands, barricades, and other elements. The VersaSkid system from the instant Applicant includes a grid design that allows VersaSkid supports, VersaSkid pipe stands, barricades, and other products equipped with a base plate to be positioned anywhere laterally and horizontally on the surface of the VersaSkid by securing (e.g., bolting) the equipment in place. This may eliminate the need to weld equipment and supports in place. Additionally, implementations consistent with the present disclosure may allow field adjustments to be made both horizontally and laterally on the VersaSkid without the need to cut the supports or equipment free and then re-weld them back into place. The VersaSkid components can be manufactured in different dimensions allowing the overall length and width of the skid to be modified as needed. Beam connector plates can be welded in place on the lateral and longitudinal I-beams allowing multiple VersaSkid units to be connected together to create the necessary footprint required for specific installations.

According to one aspect of the present disclosure, a skid apparatus is provided. The skid apparatus may include a skid frame having at least one lateral member coupled to at least one side member at a coupling location, a skid plate coupleable to at least one of the at least one lateral member or to the at least one side member, and at least one skid slot extending through the skid plate.

The skid plate may be secured to the skid frame via one or more welds. The at least one skid slot is configured to couple a pipe support to the skid plate. The pipe support may be coupleable to the skid plate using at least one fastener, the at least one fastener configured to permit movement of at least a portion of the pipe support along the at least one skid slot. The at least one skid slat may include a notch. The at least one skid opening may extend through the skid plate and may correspond to the notch. The skid apparatus may include a plurality of skid slats coupled between at least two of the at least one lateral member or the at least one side member.

According to another aspect of the present disclosure, provided is a skid system including a skid apparatus. The skid apparatus may include a skid frame including at least one lateral member coupled to at least one side member at a coupling location, a skid plate coupleable to at least one of the at least one lateral member or to the at least one side member, at least one skid slot extending through the skid plate, and a pipe support configured to couple to the at least one skid slot. The skid plate may be secured to the skid frame via one or more welds. The at least one skid slot may couple a pipe support to the skid plate using at least one fastener. The at least one fastener may permit movement of at least a portion of the pipe support along the at least one skid slot while coupled to the at least one skid slot. The skid apparatus may include at least one skid slat having a notch. At least one skid opening may extend through the skid plate and configured to correspond to the notch. The skid apparatus comprises a plurality of skid slats coupled between at least two of the at least one lateral member or the at least one side member or combination thereof.

A further aspect of the present disclosure provides a method of adapting a skid system. The method includes aligning at least a portion of a support to a skid plate of the skid system, coupling the support to the skid plate using at least one fastener, and adjusting a position of the support relative to the skid plate by translating movement of the at least a portion of the support along at least one slot opening of the skid plate. The coupling the support to the skid plate may include extending the at least one fastener through the at least one slot opening of the skid plate, and securing the support to the skid plate using the fastener. The adjusting the position of the support relative to the skid plate may include uncoupling at least a portion of the at least one fastening to permit the support to move along a length of the at least one slot opening relative to the skid plate. Adapting the skid system may include adjusting a parameter of at least one support to correspond to at least one of a pipe height or a pipe location relative to the skid plate. Adjusting the parameter may include adjusting a position of the support to correspond to the pipe location. Adjusting the parameter may include adjusting a height of the support to correspond to the pipe height.

Numerous other objects, features, and advantages of the present invention will be readily apparent to those skilled in the art upon a reading of the following disclosure when taken in conjunction with the accompanying drawings.

BRIEF DESCRIPTION OF THE SEVERAL VIEWS OF THE DRAWINGS

FIG. 6 illustrates a raised, front right side perspective view of an exemplary embodiment of a support apparatus according to aspects of the present disclosure.

DETAILED DESCRIPTION OF THE INVENTION

Figure 1:
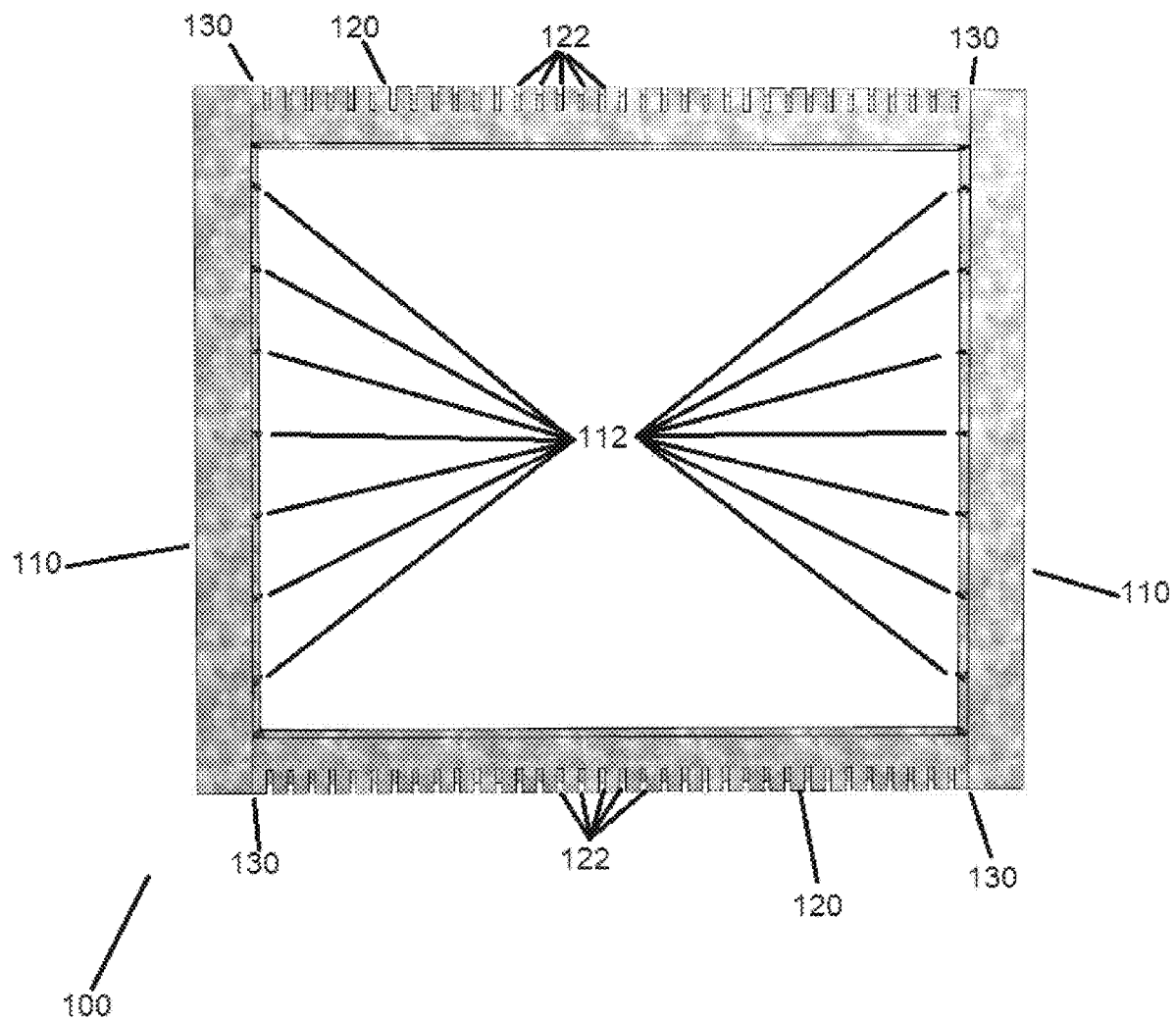
FIG. 1 illustrates an exemplary embodiment of a partial view of a skid frame according to aspects of the present disclosure.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-7, various exemplary apparatuses and associated methods according to the present disclosure are now described in detail. Where the various figures may describe embodiments sharing various common elements and features with other embodiments, similar elements and features are given the same reference numerals and redundant description thereof may be omitted below.

Various embodiments of the present invention may provide skid apparatuses, systems, and methods of manufacture and use.

FIG. 1 illustrates an exemplary embodiment of a partial view of a skid frame according to aspects of the present disclosure. The skid frame 100 includes at least one lateral member 110 coupled to at least one side member 120 at a coupling location 130. The lateral member 110 may include a top and a bottom surface (e.g., top surface visible in FIG. 1, coupled to one another by at least one lateral support 112. In one exemplary embodiment, at least one lateral support 112 may be coupled between the top and bottom surfaces in a substantially parallel configuration, although any interconnection configuration may be used in various embodiments. The side member 120 may include at least one side slot 122. One or more side slots 122 may be configured to couple to at least one element or to receive at least a portion of one or more elements. At least one lateral member 110 and/or side member 120 may be, either in whole or in part, made of metal, plastic, rubber, or any other material or combination of materials which provide sufficient rigidity and/or malleability consistent with the present disclosure.

Although described with reference to a coupling location 130, it should be appreciated that at least one coupling location 130 may include any permanent, temporary, and/or semi-permanent coupled or coupleable connection between at least one lateral member 110 and at least one lateral support 112. At least one lateral member 110 and/or lateral support 112 may be an I-beam in an exemplary embodiment. In various embodiments, at least one lateral member 110 may be coupled to at least one side member 120 by a fixed or fixable connection. For example, in various embodiments, at least one lateral member 110 may be coupled to at least one side member 120 via one or more welded coupling, bolted coupling, screwed coupling, or any other means of coupling.

Figure 2:
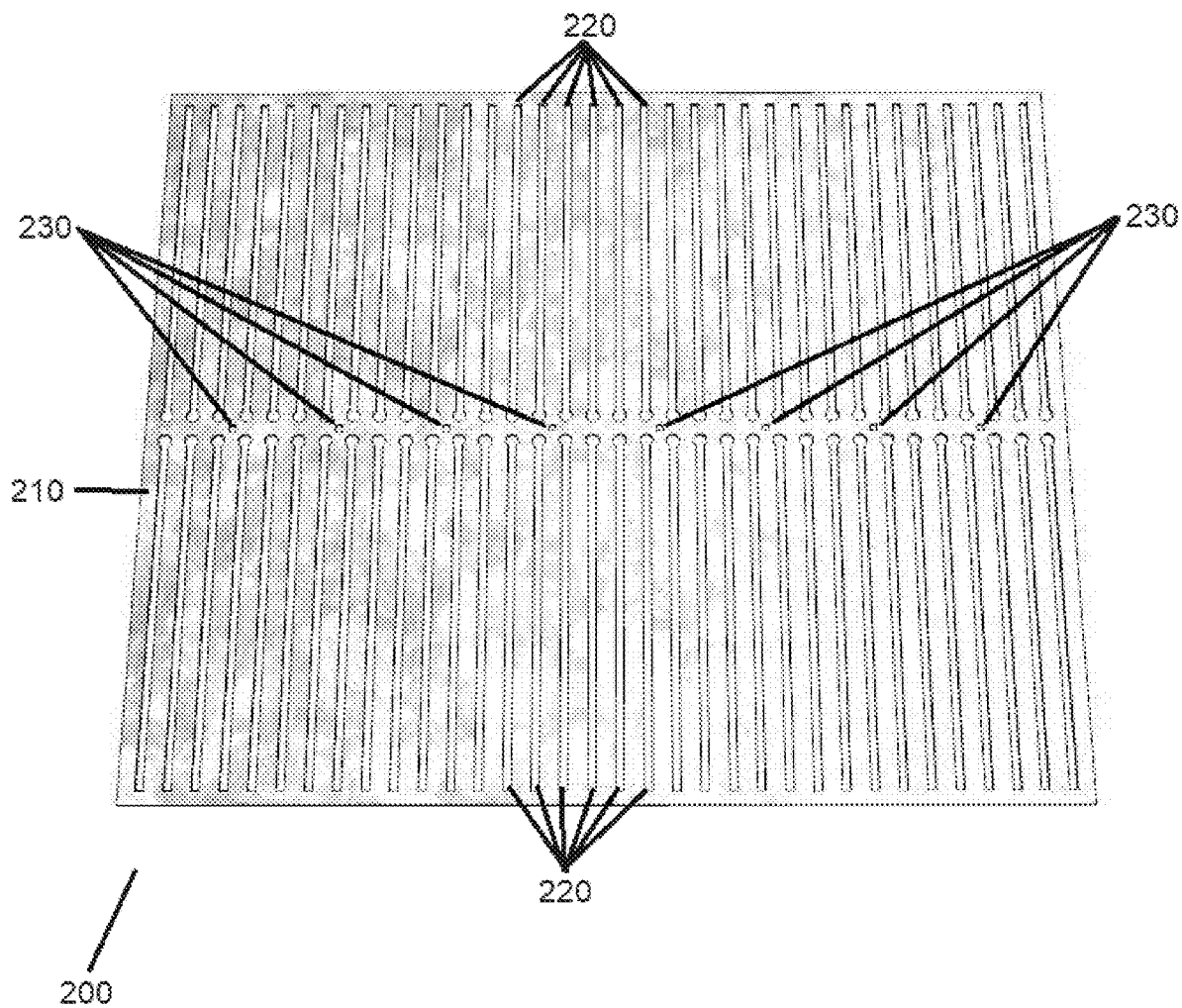
FIG. 2 illustrates an exemplary embodiment of a skid plate according to aspects of the present disclosure.

FIG. 2 illustrates an exemplary embodiment of a skid plate according to aspects of the present disclosure. A skid plate 200 includes a skid surface 210. The skid surface 210 illustrated by FIG. 2 is a top surface, but it should be appreciated that the skid surface 210 may be any surface of the skid plate 200 without departing from the spirit and the scope of the present disclosure. At least a portion of the skid plate 200 may be, either in whole or in part, made of metal, plastic, rubber, or any other material or combination of materials which provide sufficient rigidity and/or malleability consistent with the present disclosure. At least one skid slot 220 extends through a body of the skid plate 200. The number, size, and/or shape of at least one skid slot 220 may vary from the configuration illustrated by FIG. 2, which is merely exemplary.

The skid plate 200 may include at least one skid opening 230. The skid opening 230 may extend through a body of the skid plate 200 and may be configured to couple to at least one other element of the skid plate 200. The skid plate 200 may be configured to couple to at least one of the lateral member 110 and/or the side member 120 (e.g., at a top surface thereof, as illustrated by FIG. 5).

Figure 3:
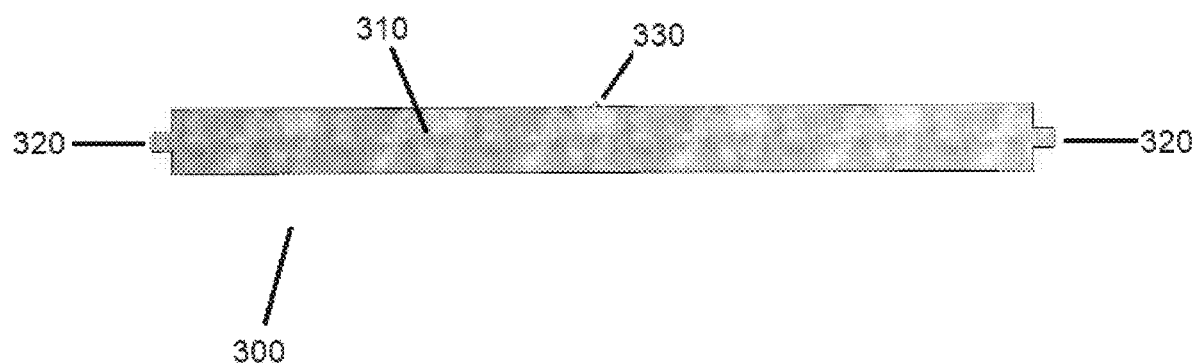
FIG. 3 illustrates an exemplary embodiment of a skid slat according to aspects of the present disclosure.

FIG. 3 illustrates an exemplary embodiment of a skid slat according to aspects of the present disclosure. The skid slat 300 includes a body 310. One or more couplers 320 may extend outwardly from the body 310. Although illustrated as extending outwardly, it should be appreciated that one or more couplers 320 may extend inwardly into the body 310 of the skid slat 300. At least one coupler 320 may be configured to couple the skid slat 300 to at least one of the lateral member 110 and/or the side member 120 (e.g. at an opening thereof). The skid slat 300 may further include at least one notch 330. The notch 330 is configured in one exemplary embodiment to extend through at least a portion of a skid opening 230 of a skid plate 200. Additionally or alternatively, the notch 330 may include or be replaced at least in part by an adhesive or other fastening or coupling element capable of coupling to a skid plate 200. At least a portion of the skid slat 300 may be, either in whole or in part, made of metal, plastic, rubber, or any other material or combination of materials which provide sufficient rigidity and/or malleability consistent with the present disclosure.

Figure 4:
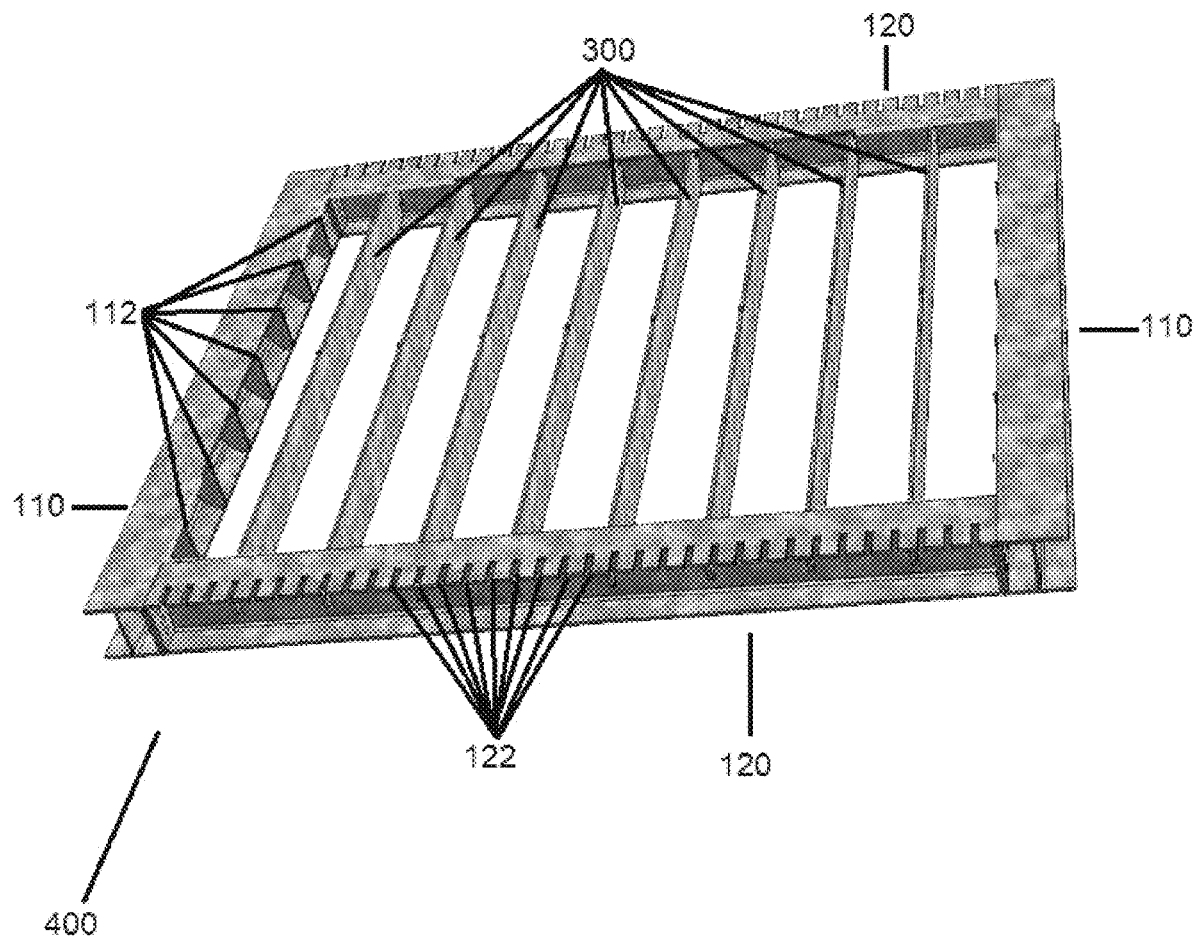
FIG. 4 illustrates an exemplary embodiment of a partial raised perspective view of a partial skid assembly according to aspects of the present disclosure.

FIG. 4 illustrates an exemplary embodiment of a partial raised perspective view of a partial skid assembly according to aspects of the present disclosure. The partial skid assembly 400 includes two lateral members 110 coupled to two side members 120. A plurality of skid slats 300 are coupled between the two side members 120. At least a portion of the skid slats 300 may be received at one or more openings or receiving areas (e.g., side slot 122) along a portion of the side members 120. In one exemplary embodiment, each side member 120 is an I-beam having a plurality of openings along a longitudinal length of the side member 120, the plurality of openings configured to receive at least a portion of a coupler 320 of a skid slat 300. Although illustrated with reference to FIG. 4 as being at the side member 120, it should be appreciated that at least one side slot 122 of the side member 120 may be replaced by or used in conjunction with at least one side slot located within at least one lateral member 110.

Figure 5:
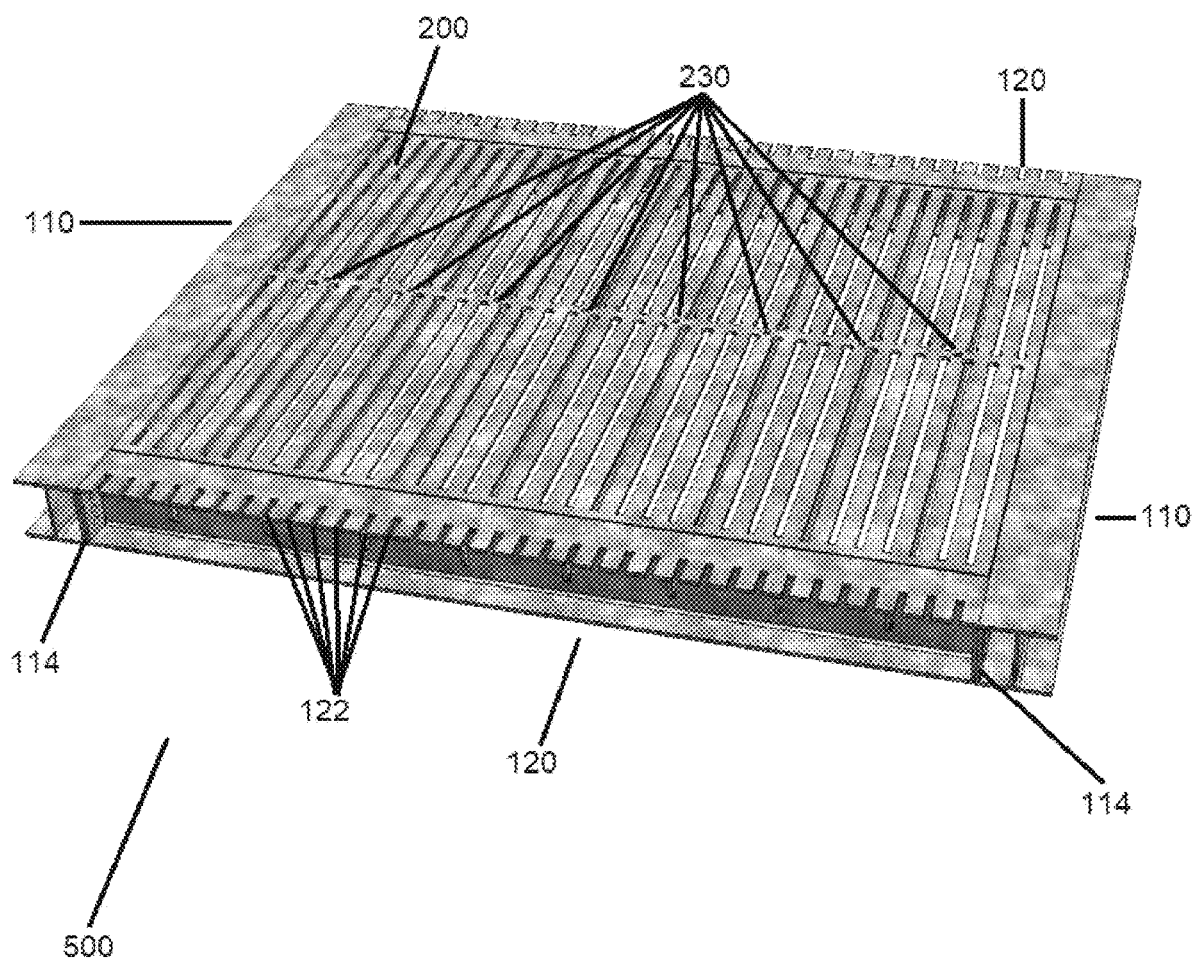
FIG. 5 illustrates an exemplary embodiment of a raised perspective view of a skid according to aspects of the present disclosure.

FIG. 5 illustrates an exemplary embodiment of a raised perspective view of a skid according to aspects of the present disclosure. The skid 500 illustrated in FIG. 5 corresponds to a partial skid assembly 400 of FIG. 4 having a skid plate 200 at a top surface thereof. At least one notch 330 optionally extends at least partially through a skid opening 230 when the skid plate 200 is provided. In the embodiment illustrated by FIG. 5, eight skid openings are present on the skid plate 200 and receive a corresponding notch from eight skid slats coupled between two side members 120.

In many implementations, the frame of a skid includes four I-beams (e.g., two lateral members 110 and two side members 120). The top outside flanges of the two side members 120 are notched at equal distances for the entire length of the beam (e.g., as side slots 122). The side slots 122 are on the outside portion of the flange from the edge to the beginning of the web. A beam connector plate is coupled (e.g., welded in place) at both ends of the lateral member(s) 110 and side member(s) 120. Two additional beam connector plates are optionally coupled (e.g., welded in place) to each lateral I-beam (e.g., side member 120) in parallel with the lateral I-beams and in conjunction with the beam connectors (e.g., at an opening configured to receive at least a portion of a skid slat 300) located on the longitudinal beams. The longitudinal and lateral I-beams (i.e., lateral member 110 and side member 120) may be connected by bolting the I-beam connector plates together creating the frame of the skid. Support slats may be cut from steel plate in an exemplary embodiment.

Tabs may be cut or pre-formed in both ends and on the top of the support slat (e.g., forming the couplers 320 and notch 330 illustrated by FIG. 3). Support slats may run parallel with the lateral I-beams and the face of the slat is may be a perpendicular orientation. The slats may be held in place by sliding tabs through notches that have been cut in the lateral I-beams and the top plate. The top plate may rest on the support slats and inside the I-beam frame. Additional tabs may be coupled (e.g., welded on) to the lateral I-beams inside the flanges to provide another point of support for the top plate at both ends of a VersaSkid.

The top plate of the skid may be a steel plate with lateral channels cut to correspond to the channels in the longitudinal beams. The lateral channels may begin at a set distance from the edge of the top plate and run to the middle of the top plate from both longitudinal beams, where they are terminated into holes cut on each side of the center line of the top plate. The center of each hole may be a set distance apart from the hole of the corresponding channel on the opposite side of the center line. Round cuts may allow the head of a carriage bolt or other fastening element to be inserted into the channel and to slide horizontally across the skid plate. The channels in the top plate and longitudinal I-beams may create a grid that allows equipment and skid products fitted with one or more base plates to be secured (e.g., bolted) in place.

The skid base plate may include holes corresponding to the channels in the longitudinal I-beams and the top plate. The plates can be manufactured in various sizes to meet the requirements of the equipment being bolted in place. Carriage bolts may be used to fasten equipment into place and can easily be adjusted in the field by loosening the appropriate nuts, re-positioning equipment as needed, and then re-tightening the nuts and securing the equipment in place.

FIG. 6 illustrates a raised, front right side perspective view of a support apparatus according to an exemplary embodiment. As shown in FIG. 6, in one exemplary embodiment, a support 600 includes a base 610 coupled to base plate 620 at a connection location 612. The base 610 has the shape of a cylinder in the embodiment illustrated in FIG. 6, but may additionally or alternative include at least, either in whole or in part, an elongated rectangle, an elongated triangle, or any other shape, number of edges, continuity, or type capable of coupling to the base plate 620. The base 610 is coupled to the base plate 620, for example, by welding, by at least one of the base 610 and the base plate 620 having a threaded section configured to be coupled to either the base 610 or the base plate 620 (or a coupler corresponding thereto), and/or may be pre-formed during manufacture. The base plate 620 may include at least one coupling location 622. A coupling location 622 may be a through hole or other absence of material permitting the base plate 620 to be coupled to an external element, such as a skid pad. Additionally or alternatively, at least one coupling location 622 may include a fastener or other element (not illustrated) configured to permit fastening of the base plate 620 to one or more external elements. In various embodiments, the support 600 may be a support stand, for example a pipe stand, configured to support at least one element at the base plate 620 (such as a pipe or other external element).

The support 600 may include an adjustment rod 632 coupleable between to a surface of the base 610 and a surface of the rod sleeve 636. The adjustment rod 632 may be fixedly and/or rotatably coupleable to the rod sleeve 636 and may be rotatably coupleable to the threaded slug 614. Although illustrated at a top end of the base 610 and a lower portion of the rod sleeve 636 (e.g., via the adjustment nut 634) in FIG. 6, the adjustment rod 632 may be coupleable to any exterior or interior surface of the base 610 and/or rod sleeve 636 without departing from the spirit and the scope of the present disclosure.

The threaded slug 614 may be placed within at least a portion of the base 610. Although described with reference to being threaded, at least a portion of the threaded slug 614 may be smooth, may have variable threading, or may have one or more other fastening or adjustment sections or materials included therein or coupleable thereto. In one exemplary embodiment, the threaded slug 614 may extend through an entire length of the base 610. A locking nut 630 may be coupled to the adjustment rod 632 and configured to set an elevation of the top plate surface relative to the base 610 via a position of the threaded slug 614, e.g., by restricting movement of the adjustment rod 632 relative to the threaded slug 614. The locking nut 630 may be configured to provide a locking function between the base 610 and the adjustment rod 632, and may create a setoff distance from the base 610 to at least one element coupled to the adjustment rod 632.

A rod sleeve 636 may be coupled to an adjustment nut 634, the adjustment nut 634 being coupleable to the adjustment rod 632. In various embodiments, the adjustment nut 634 may include at least one threaded portion at an interior or exterior surface configured to permit a height of the support 600 to be adjusted (e.g., by clockwise or counter-clockwise movement of the adjustment rod 632 relative to the threaded slug 614. The adjustment rod 632 may be coupled to or otherwise connectable with an adjustment nut 634. The adjustment nut 634 may be threaded and configured to translate along a threaded surface of the adjustment rod 632 in one embodiment. The rod sleeve 636 may be coupled to a pad plate 646. The pad plate 646 may have a pad 644 coupled to a surface thereof. The pad 644 is configured in one embodiment as an anti-vibration pad configured to restrict or inhibit movement or vibration of an element in contact with the pad 644. The pad 644 may include at least a portion of Fabreeka material in various embodiments, although any vibration-reducing or other type of pad or material may be used without departing from the scope of the present disclosure.

The pad plate 646 may be configured with one or more through holes 642. One or more through hole 642 may be configured to receive at least a portion of a coupler 640 therethrough. One or more through holes 642 may have a movement restriction device coupleable thereto, for example a nut, configured to restrict movement of a coupler 640 therethrough. Although illustrated as having two couplers 640, it should be appreciated that various embodiments may include one or three or more couplers 640. Each coupler 640 may include any contact surface or enclosing member configured to prevent movement, restrict movement, or otherwise inhibit motion or movement of an element coupled thereto or there within. The coupler 640 is illustrated as a U-bolt in FIG. 6, but may be any connector, fastener, or material satisfying the above description of a coupler 640. In the embodiment illustrated by FIG. 6, two couplers 640 are used, the legs of each passing through a through hole 642 of the pad plate 646. In various embodiments, a locking nut or other fastening means may be used to secure one or more legs of the coupler 640 to the pad plate 646. The pad plate 646 may include a top surface 638.

One exemplary embodiment of a support 600 includes a top plate (e.g., pad plate 646) covered with a Fabreeka pad (e.g., pad 644) configured to act as a vibration isolation pad. A supported pipe may rest on the Fabreeka pad and may be held in place using at least one coated U-bolt (e.g., coupler 640) configured to bolt in place through holes that are drilled in the top plate. Structural tubing (e.g., rod sleeve 636) may be welded to the bottom of the top plate. A threaded shaft (e.g., adjustment rod) may be inserted into the structural tubing and the base of the top plate may rest on the head of the threaded shaft. The opposite end of the threaded shaft may be screwed into a tapped slug (e.g., threaded slug 614) that is welded into the top of the base of the pipe support consisting of a piece of structural tubing. The shaft position can be adjusted by tightening or loosening the threaded shaft into the tapped slug. This results in an adjustment of the height of the top plate and supported pipe to the necessary level. The base (e.g., base plate 620) of the structural tubing can be welded to structural steel, attached to a concrete pad, or fitted with a base plate. A base plate can be welded to the base of the stand allowing the support to be bolted into place on a structural skid.

The size of the pipe to be supported may determine the size of the top plate, the coated U-bolts, the structural tubing, and/or the threaded shaft to be used. The threaded shaft may allow height adjustment of the pipe support to several inches and might only be limited to the size of the threaded shaft. The length of the structural tubing can be adjusted as needed to increase the height of the support as well.

One or more surfaces of the pipe support may be treated, coated, or include appropriate metals to prevent corrosion and allow the threaded shaft to be adjusted by tightening or loosening through the tapped round. The treated surfaces may include, but are not limited to, galvanizing, painting, and Xylan coating. Materials of the pipe support may include, but are not limited to, carbon steel and stainless steel.

Figure 7:
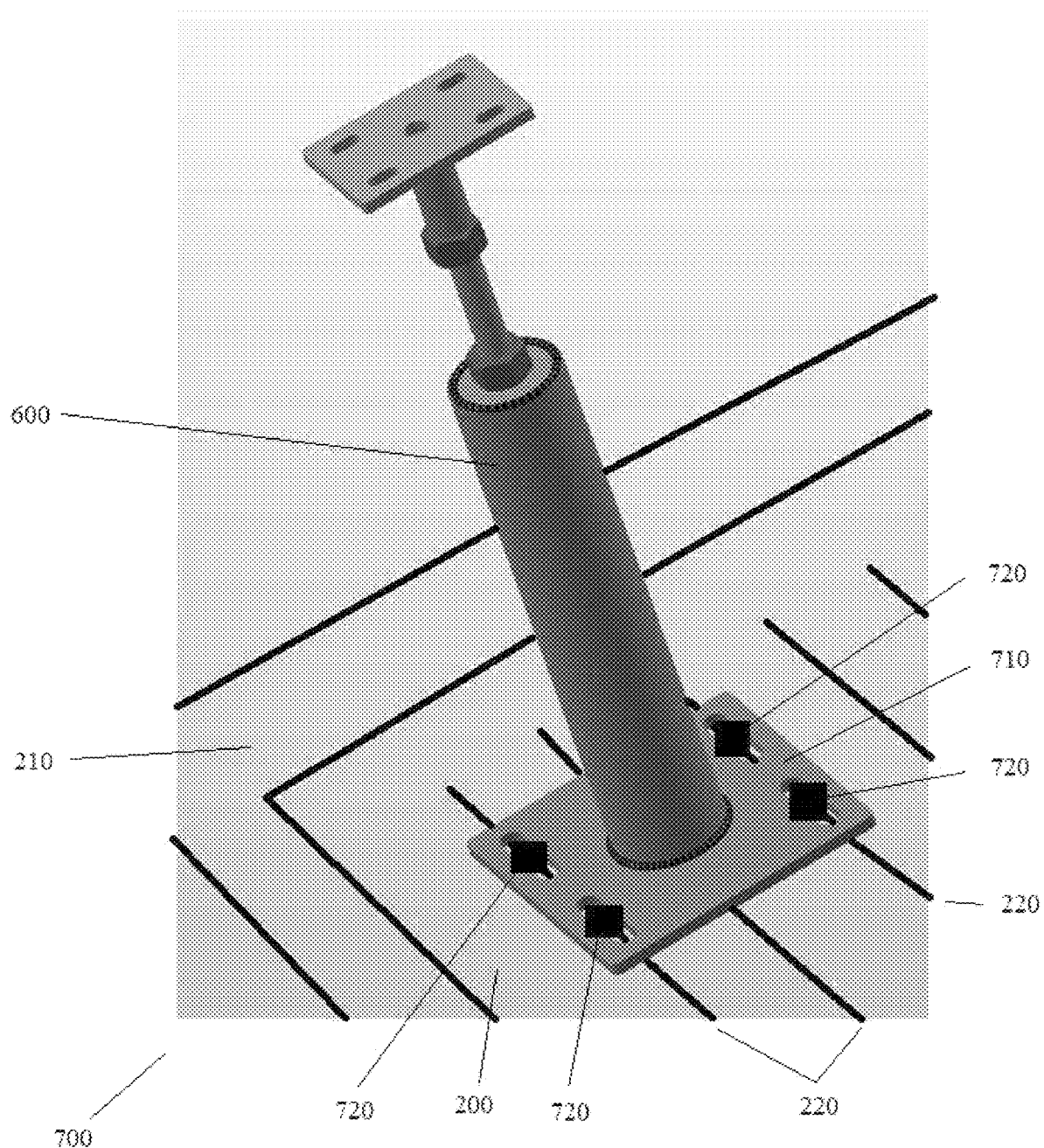
FIG. 7 illustrates a raised, front right side perspective view of an exemplary embodiment of a support apparatus according to aspects of the present disclosure.

FIG. 7 illustrates a partial raised perspective view of an adjustable support coupled to a skid according to aspects of the present disclosure. The system 700 includes an adjustable support 600 coupled to a skid, for example at a skid plate 200 thereof. One or more fasteners 720 may be used to couple at least a portion of an adjustable support 600 to the skid, for example via one or more skid slots 220 of the skid plate 200. In various embodiments, a screw, nut, or other type of fastener may be used as a fastener 720 without departing from the spirit and scope of the present disclosure.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A skid system, comprising:
   a skid apparatus having,
      a skid frame including at least one lateral member coupled to at least one side member at a coupling location;
      a skid plate coupleable to at least one of the at least one lateral member or to the at least one side member; and
      at least one skid slot extending through the skid plate; and
   a pipe support configured to couple to the at least one skid slot.

2. The skid system of claim 1, wherein the skid plate is secured to the skid frame via one or more welds.

3. The skid system of claim 1, wherein the at least one skid slot is configured to couple a pipe support to the skid plate using at least one fastener.

4. The skid system of claim 3, wherein the at least one fastener is configured to permit movement of at least a portion of the pipe support along the at least one skid slot while coupled to the at least one skid slot.

5. The skid system of claim 1, wherein the skid apparatus includes at least one skid slat having a notch.

6. The skid system of claim 5, further including at least one skid opening extending through the skid plate and configured to correspond to the notch.

7. The skid system of claim 5, wherein the skid apparatus comprises a plurality of skid slats coupled between at least two of the at least one lateral member or the at least one side member or combination thereof.

* * * * *